April 25, 1939.

D. D. DOOLEY 2,155,476

TRANSMISSION

Filed Aug. 3, 1936

Inventor:
Delmar D. Dooley
By: Mason, Jackson, Borlick & Brenner
Attys.

April 25, 1939.  D. D. DOOLEY  2,155,476
TRANSMISSION
Filed Aug. 3, 1936  3 Sheets-Sheet 3

Inventor:
Delmar D. Dooley
By Brown Jackson Boettcher Dienner
Attys.

Patented Apr. 25, 1939

2,155,476

UNITED STATES PATENT OFFICE 2,155,476

TRANSMISSION

Delmar D. Dooley, Rock Island, Ill., assignor of one-fourth to Clarence H. Dooley, Rock Island, Ill., one-fourth to H. Keith Dooley, Los Angeles, Calif., and one-fourth to Herbert C. Snow, Auburn, Ind.

Application August 3, 1936, Serial No. 93,938

26 Claims. (Cl. 74—328)

The present invention relates generally to transmissions for automotive vehicles and the like, and especially to those transmissions affording four forward speeds, with two available silent cruising speeds.

The principal object of the present invention is the provision of an automotive transmission embodying two relatively high speed ratios, one available for cruising and preferably but not necessarily secured by the use of epicyclic gearing, whereby such ratio is silent and one in which the drive is other than through the epicyclic gearing or other unit and in which the parts that operate idly rotate at a relatively slow rate of speed, thereby reducing bearing wear, the inertia effect of such parts, which might otherwise effect shifting, and securing other advantages.

A further object of the present invention is the provision of an automotive transmission having an epicyclic gear unit in which the cage for the planet gears is formed of bronze or similar metal and can therefore serve as a bearing, both for the outer ring gear member and also for the inner stationary sun gear member on the driven shaft. One particular advantage of this arrangement is that the epicyclic unit is compact and of relatively small size.

A further object of the present invention is the provision of an automotive transmission embodying an epicyclic gear unit in which the parts are so arranged that portions of the epicyclic gear unit always rotate slower than engine speed, thereby facilitating gear changing in the operation of the transmission.

These and other objects and advantages of the present invention will be apparent to those skilled in the art after a consideration of the following detailed description of the preferred structural embodiments, taken in conjunction with the accompanying drawings.

Figure 1:
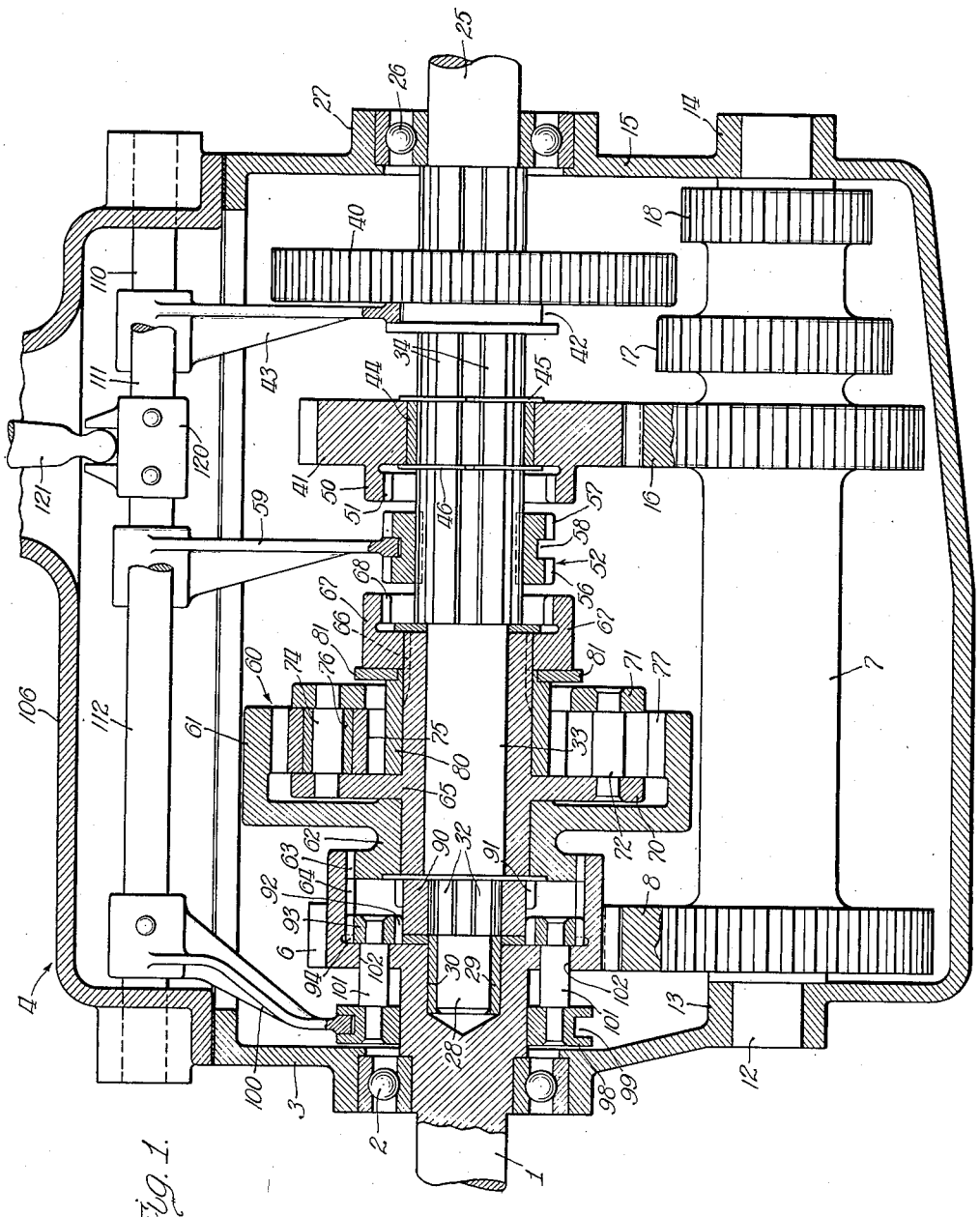
Figure 1 shows a transmission in which four forward speeds are available, with the highest speed in direct drive and the third speed in epicyclic gearing.

Referring now more particularly to th form of the invention shown in Figure 1, a driving shaft 1 is journaled for rotation by bearing means 2 in the front wall 3 of the transmission housing which is indicated in its entirety by the reference numeral 4. The driving shaft 1 carries a gear member 6, preferably, but not necessarily, formed integral therewith, and the gear 6 drives a tubular countershaft 7 through a gear 8 on the forward end thereof. The tubular countershaft 7 is journaled by suitable bearing means on a fixed or stationary shaft 12 carried in a suitably formed boss 13 on the forward wall 3 of the transmission and in a similar boss 14 formed in the rear wall 15 of the transmission housing 4. The countershaft 7 carries other gears 16, 17 and 18 which will be referred to later.

The driven shaft is indicated by the reference numeral 25 and is supported at its rear end by bearing means 26 carried in a boss 27 formed on the rear wall 15 of the transmission housing 4, and at its forward end the driven shaft 25 is reduced, as at 28, and is supported on a bushing 29 carried in the recess 30 formed in the rear end of the driving shaft 1 substantially in the plane of the countershaft driving gear 6. Just rearwardly of the reduced end 28 of the driven shaft 25 the latter carries splines 32, and rearwardly of the splined section 32 is a smooth section 33. The rear portion of the driven shaft 25 is splined, as indicated at 34, from the section 33 to a point near the rear end thereof. A pair of gears 40 and 41 are mounted on the splined portion 34 of the driven shaft 25. The gear 40 carries a shifter groove 42 in which a shift fork 43 is disposed. The other gear 41 is mounted for rotation relative to the driven shaft 25 by means of a bushing 44, and the gear 41 is held against movement axially with respect to the driven shaft 25 by a pair of spring rings 45 and 46. The gear member 41 includes a hub section 50 which is provided with internal teeth 51, and a clutch member 52 is mounted for sliding but nonrotatable movement on the driven shaft 25 adjacent the forward end of the splined portion 34. The clutch member 52 carries two sets of clutch teeth 56 and 57, and the latter set of teeth is adapted to be engaged with the teeth 51 formed on the gear 41 so as to connect the latter for rotation with the driven shaft whenever the clutch member 52 is shifted rearwardly from the position shown in Figure 1. The clutch member 52 has a groove 58 to receive a shift fork 59. The gear 40 may be shifted forwardly into mesh with the gear 17, to establish first or low speed, and the gear member 40 may also be moved rearwardly to engage a reverse idler (not shown) driven from the countershaft gear 18. If desired, of course, the reverse idler may be driven from the low speed countershaft gear member 17. The gear member 41 is preferably of the helical type, in constant mesh with the countershaft gear 16, and shifting the clutch member 52 rearwardly serves to connect the gear member 41 to the driven shaft 25 for the purposes of establishing second speed.

According to the principles of the present invention, the driving and driven shafts may be connected directly together or they may be connected together through an epicyclic gear unit, so as to make available two cruising speeds particularly arranged to provide for relatively high vehicular speed at two different ratios under the control of the operator. With this in view, the present invention provides one of the ratios through an epicyclic gear that is indicated in its entirety by the reference numeral 60. The unit 60 comprises a ring gear 61 having a hub section 62 formed with splines or teeth 63 that are received by similarly formed teeth 64 in the rearward extension of the driving shaft gear member 6. Thus, the ring gear 61 of the epicyclic gear unit is constantly rotatable with the driving shaft 1. The ring gear member 61 is rotatably mounted on the forward end of the driven shaft 25 by being disposed on the forward end of a bronze planet gear carrier 65, the rear end of which is splined, as at 66, to receive a clutch member 67 in non-rotatable relation. The clutch member 67 is formed with clutch teeth 68 which are adapted to be engaged by the clutch teeth 56 on the shiftable member 52 when the latter is shifted forwardly from the position shown in Figure 1. The planet gear carrier 65 includes a flanged portion 70 to which a ring member 71 is fixed in spaced relation by means of shouldered rivets 72 or the like. The flange 70 and the ring 71 carry pins 74 upon which a plurality of planet gears 75 are mounted, as by bushings 76. The planet gears 75 mesh with the internal teeth 77 of the ring gear 61 and with the teeth formed on a stationary sun gear 80 which is journaled on the bronze planet gear carrier 61 and which is held against rotation by means of a yoke or bracket 81.

There is a space between the forward end of the bronze carrier 65 and the rear end of the driving shaft 1, and in this space a clutch collar 90 is fixedly mounted on the splines 32 of the driven shaft 25. The clutch collar 90 is provided with a plurality of clutch teeth 91 with which teeth 92 on a shiftable clutch member 93 are adapted to engage. The clutch member 93 also carries exterior teeth 94 that are in the nature of splines cooperating with the splines 64 formed on the interior portion of the hollow gear member 6 and which accommodate the sliding movement of the clutch member 93 to permit its being moved into engagement with the teeth 91 on the driven shaft collar 90. When the member 93 is moved rearwardly to the position just indicated, the driving and driven shafts are connected together for direct rotation at a one to one ratio.

The axial movement of the clutch member 93 is controlled by a shift collar 98 having a groove 99 formed therein and receiving a shift fork 100. The collar 98 is connected with the clutch ring 93 by pins 101 or the like, the ends of which are riveted, respectively, to the members 93 and 99 and are axially movable through suitably formed openings 102 in the web of the countershaft driving gear 6. The shift forks 43, 59 and 100 are mounted, respectively, on shift rails 110, 111 and 112, each carrying a shift yoke 120 that is adapted to be engaged by the lower end of a gear shift lever 121, as will be referred to later.

In operation, reverse is obtained by shifting the gear member 40 rearwardly, and low speed is obtained by shifting the gear member 40 forwardly. Second speed is obtained by shifting the clutch collar 52 rearwardly. When the clutch member 52 is shifted forwardly, the teeth 56 thereof engage the teeth 68 formed on the member 67 that is keyed or splined onto the planet gear carrier 65. Thus, the latter member, which normally rotates with respect to the driven shaft and is disposed about the smooth section 33 thereof, is connected to rotate with the driven shaft 25. However, the sun gear 80 is held stationary by virtue of the yoke 81 which is anchored at one or both ends to the transmission housing. In this arrangement of the parts, the drive is transmitted from the driving shaft 1 to the ring gear 61 which is in mesh with the planet gears 75. The rotation of the ring gear 61 rolls the planet gears 75 about the stationary sun gear 80, and this advances the bronze carrier or cage 65 at a rate somewhat slower than the rate of rotation of the driving shaft 1. Since the member 67, fixed to the rear end of the carrier 65, is clutched to the driven shaft 25, the latter is thus rotated at a rate somewhat slower than engine speed but faster than the driven shaft would be rotated through either of the gears 40 and 41. It is to be noted that in the form of the invention shown in Figure 1, the epicyclic gear unit transmits the drive in third speed.

When it is desired to effect fourth speed or direct drive, the clutch member 52 is moved out of engagement with the member 67 and the clutch ring 93 is then shifted rearwardly so that the teeth 92 on the member 93 engages the teeth 91 formed on the collar 90 that is fixed to the driven shaft. It is to be noted that when the parts are arranged in this manner the driving and driven shafts are connected directly together. The rotation of the driving shaft 1 carries with it the ring gear 61, and since the sun gear 80 is stationary at all times the cage or carriage 65 is advanced, but this advance is at its lower rate than engine speed so that little wear on these parts occurs, not only because of the slow speeds in which they are driven but also because they rotate idly and not under load in this gear ratio. As is apparent, even when the drive is transmitted through the epicyclic gear unit 60 for third speed, the cage or planet gear carrier 65 is rotated slower than engine speed. This is of particular advantage in changing from second to third speed or vice versa.

For the purpose of controlling the various shiftable parts, the cover for the transmission housing 4, indicated at 106, is provided with the three shift rods or rails 110, 111 and 112 mentioned above, the latter carrying the shift fork 100 that controls the direct engaging clutch ring 93, and the shift rail 111 serves to carry the shift fork 59 that controls the clutch member 52. The shift fork 42 for the low speed gear is mounted on the shift rail 110. Each of the shift rails carries a slotted yoke 120 in which the lower end of a conventional gear shift lever 121 is disposed. The lever 121 is particularly adapted for manual control or by some form of automatic or remote control in which the conventional sequence of shifting movements is present.

It is to be noted that even though four forward speeds are provided by the present transmission, the conventional sequence of movements of the gear shift lever 121 is possible. That is, considering the lever 121 as a conventional pivoted hand operated lever, for reverse the upper end of the lever is moved forward and in its left hand position, which shifts the rail 110 rearwardly, and then bringing the upper end of the gear shift lever directly to the rear, the shift rail 110 is moved forwardly and carries the gear 40 into mesh with the countershaft gear 17. Moving the upper end of the gear shift lever 121 forwardly to neutral position and then to the right and forwardly picks up the second shift rail 111 and moves the clutch 52 into engagement with the hub 50 on the gear 41, thereby establishing second speed. Moving the upper end of the gear shift lever in this position directly rearwardly moves the clutch collar 52 out of engagement with the gear 41 and into engagement with the hub 67 on the planet gear carrier 65. Returning the gear shift lever to neutral and then shifting the same another step to the right and forwardly, as in conventional sequence, engages the third shift rail 112 and moves the clutch ring 93 rearwardly into engagement with the collar 90 fixed to the driven shaft 25, thereby connecting the driving and driven shafts 1 and 25 directly together.

Figure 2:
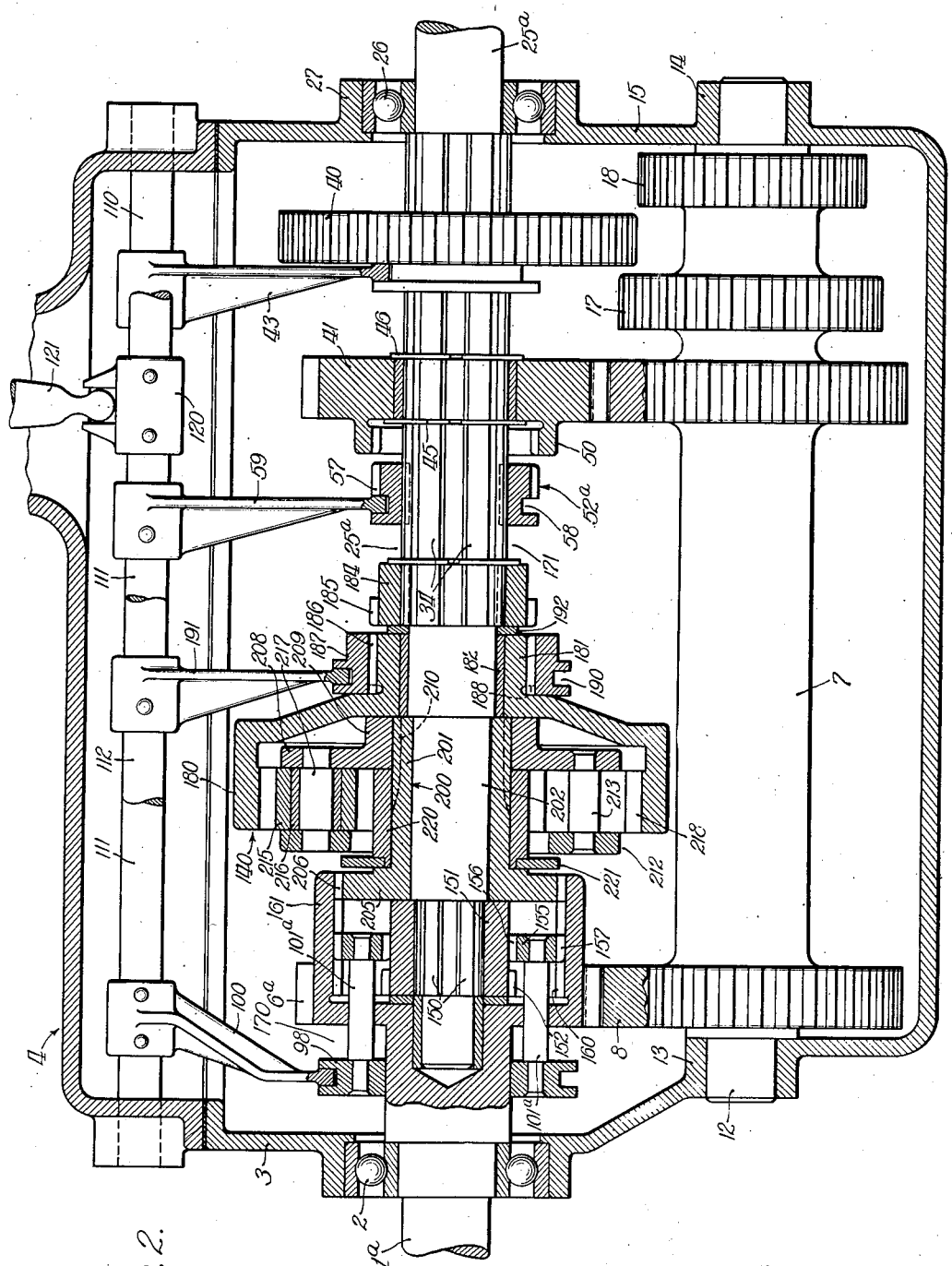
Figure 2 illustrates an arrangement in which the epicyclic unit is arranged as an overdrive, with fourth or highest speed being obtained through said epicyclic unit and with third speed being secured with the driving and driven shafts connected directly together.

The form of the invention shown in Figure 2 embodies the advantage of the principles and parts shown in Figure 1 and described above, and hence the same reference numerals shown in Figure 1 have been applied to the corresponding parts shown in Figure 2. In the latter figure, however, the epicyclic gear unit, indicated in its entirety by the reference numeral 140, is arranged as an overdrive and is utilized in fourth speed where the rear axle ratio is that in conventional use at the present time, approximately 4 to 1. In Figure 1, the rear axle ratio employed approximately 3 to 1, so that when the driving and driven shafts 1 and 25 in Figure 1 are connected directly together, the vehicle is driven at approximately the same ratio of speed that it is driven when the overdrive unit 140 is employed, as in Figure 2, with a rear axle ratio at approximately 4 to 1. In Figure 2, the driving shaft 1a is journaled by bearing means 2 in the forward wall 3 of the transmission housing 4 and carries a countershaft driving gear 6a. The distance between the transmission wall 3 and the gear member 6a is appreciably greater than in Figure 1 for a purpose which will appear later.

The driven shaft 25a carries a low speed gear 40 of substantially the same construction shown in Figure 1, which can be engaged with the countershaft gear 17 to secure low speed or first, and the driven shaft 25a also carries the gear 41 which is rotatable thereon and is held in place by split rings 45 and 46, in a manner described above. A clutch member 52a is mounted on the splines 34 of the driven shaft 25a, but in Figure 2 the member 52a is a single clutch member having only one set of teeth 57 and a shift groove 58 in which the fork 59 is disposed, as in the form of the invention shown in Figure 1.

The driving and driven shafts 1a and 25a in Figure 2 are adapted to be connected directly together for third speed by means of clutch mechanism similar to that shown and described above for effecting fourth speed in Figure 1. In Figure 2, the driven shaft 25a carries a splined section 150 that is somewhat longer than the section 32 shown in Figure 1, and a collar 151 is mounted on the splined section 150 and is formed with a plurality of clutch teeth 152 on the forward portion of the collar 151. A shiftable clutch ring 155 is disposed about the driven collar 151 and carries two sets of teeth 156 and 157. The set of teeth 157 engages in splines 160 formed on the interior of the extended hub section 161 of the gear member 6a so as to cause the clutch member 155 to be rotated with the driving shaft 1a at all times. The inner set of teeth 156 is adapted to engage the teeth 152 and thus connect the driving and driven shafts 1a and 25a directly together.

The shiftable clutch ring 155 is controlled by substantially the same means shown in Figure 1 and described above, that is, by a shiftable ring 98 and a shift fork 100, with pins 101a riveted to the members 98 and 155 and passing through openings formed in the web of the countershaft driving gear 6a. In Figure 2 it is to be noted that the shift forks 59 and 100 are mounted on the same shift rail 111 so that both members 52a and 155 move together. When the clutch member 52a is moved rearwardly to connect the gear 41 to the driven shaft 25a, the shiftable clutch ring 155 experiences a rearward movement, but in the form of the invention shown in Figure 2, this movement is idle and does not affect the relation of the parts. However, sufficient space, indicated at 170, must be provided between the shift collar 98 and the forward face of the gear 6a to accommodate this movement. Similarly, sufficient space 171 must be provided forward of the clutch member 52a so as to accommodate an idle movement of this member when the shift ring 98 is moved forwardly to bring the clutch member 155 into engagement with the teeth 152 to effect third or direct speed in this modification.

The epicyclic gear unit 140 includes a ring gear 180 having a hub 181 journaled, as by a bushing 182, on the driven shaft 25a forward of the splines 34 thereof and also forward of a clutch member 184 that is fixed in any suitable manner to the driven shaft 25a. If desired, the splines 34 may be carried forwardly to be engaged by the clutch collar 184. The latter member carries teeth 185 that are adapted to be engaged by internal teeth 186 formed on a shiftable clutch member 187. The member 187 is mounted for sliding movement on external splines 188 formed on the outer surface of the ring gear hub 181. The member 187 is provided with a shifter groove 190 in which a shift fork 191 is adapted to be disposed. A thrust bearing 192 is disposed between the rear end of the ring gear hub 181 and the forward portion of the driven clutch collar 184. The ring gear 180 is free to rotate with respect to the driven shaft 25a except when the clutch collar 187 is disposed rearwardly in engagement with the clutch member 184. When this is done the ring gear 180 is fixed to rotate with the driven shaft 25a.

The epicyclic gear unit 140 also includes a bronze planet gear carrier indicated in its entirety by the reference numeral 200. The bronze sleeve 201, which forms a part of the member 200, is journaled for rotation on the smooth portion 202 of the driven shaft 25a and is provided with a peripheral flange 205 which has teeth or splines 206 that are in constant engagement with the extended hub portion 161 of the gear 6a on the driving shaft 1a. The planet gear carrier also includes a flanged ring 208 having a hub 209 that is fixed, as by splines 210, to the rear end of the bronze sleeve 201, and a companion ring 212 is fixed to the flanged ring 208 by shouldered rivets 213. The planet gears 215 are mounted, as by bushings 216, on pins 217 and mesh with the teeth 218 on the internal ring gear member 180 and with a sun gear 220 that is held against rotation by a yoke 221 that is fixed at one or both ends to the transmission housing 4.

In operaton, rearward movement of the shift fork 43 shifts the gear 40 rearwardly and completes reverse drive, and forward movement of the shift fork 43 carries the gear 40 into engagement with the gear 17 for low speed drive. Second speed is obtained by shifting the clutch member 52a rearwardly into engagement with the toothed portion 50 of the gear 41, thereby connecting the latter with the driven shaft 25a. This movement also shifts the clutch members 155 and 98 rearwardly, since the shift fork 100 is fixed to the same rail 111 that the fork 116 is fixed, but this is an idle movement since the member 155 merely moves into the space 170. Third speed, or direct, is obtained in the construction shown in Figure 2 by moving the clutch member 155 forwardly into engagement with the teeth 152 on the collar 151, thereby connecting the driving and driven shafts 1a and 25a together. Fourth speed, through the epicyclic overdrive unit 140, is obtained by shifting the fork 191 rearwardly to carry the shift ring 187 into engagement with the teeth 185 formed on the collar 184 fixed to the driven shaft 25a. It will be understood, of course, that before shifting the clutch members 52a and 155 the gear 40 will be returned to its neutral position, and before shifting the clutch member 187 the clutch 52a and the member 155 will be returned to their neutral positions.

It will be observed from the above description that, according to the principles of the present invention, the conventional sequence of shifting operations is available in the transmission shown in Figure 2, that is to say, reverse and low speeds are completed by a shifting movement of one rail, second and third speeds are completed by movement of the second rail, and fourth speed is controlled by movement of a third rail, fourth speed position being opposite third speed position so as to obtain the desired conventional sequence. In the present invention, this is possible by virtue of separate clutch members 155 and 187 for completing third and fourth speeds, respectively, and by connecting the second speed clutch members 52a with the same shift rail 111 that the third speed clutch member 155 is connected.

Figure 3:
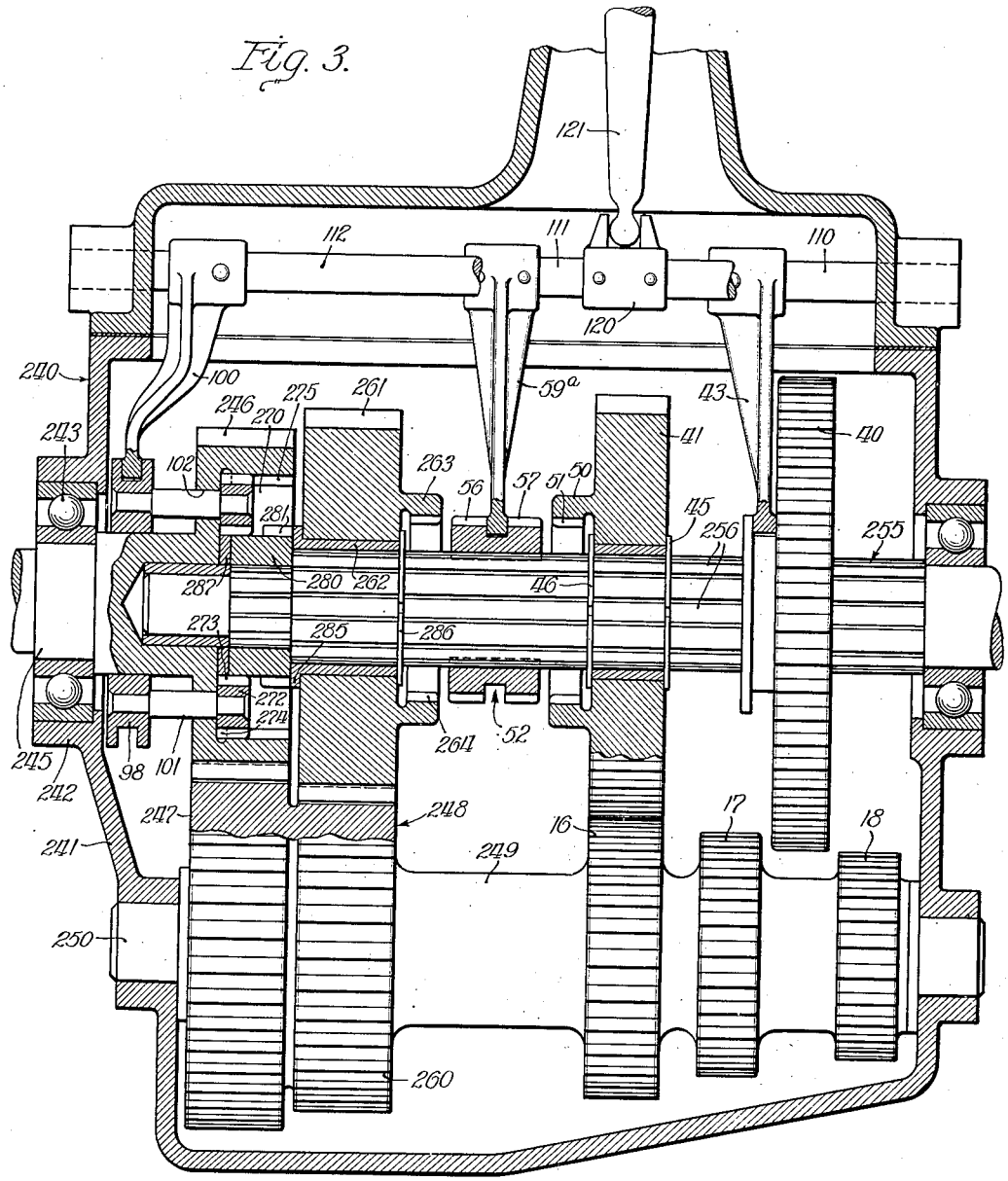
Figure 3 is a sectional view of a transmission, somewhat similar to Figure 1, but in which the epicyclic gear unit is replaced by spur or helical gears.

Figure 3 represents a transmission embodying the principles of the present invention but which does not employ epicyclic gearing or similar units, but otherwise the form of the invention shown in this figure is quite similar to that illustrated in Figure 1, especially as regards the shiftable mechanism controlling third and fourth speeds. Referring now to Figure 3, the reference numeral 240 indicates the transmission housing having a forward wall 241 with a bearing boss 242 which receives the bearing means 243 that supports the rear end of the driving shaft 245. This shaft carries, or has integrally formed therewith, a driving gear 246 which meshes with a gear member 247 that forms a part of a compound gear unit indicated in its entirety by the reference numeral 248 and formed on or carried by a countershaft 249 which is preferably, but not necessarily, supported on a fixed shaft 250 disposed in the lower part of the transmission housing 240. At the rear end of the countershaft 249 there are other gears 16, 17 and 18 having the functions of the gears 16, 17 and 18 shown in Figure 1 and hence the same reference numerals are used.

In Figure 3, the driven shaft is indicated at 255 and includes a splined section 256 on which the gears 40 (see Figure 1) and 41 are mounted in the manner described above, gear 40 being controlled by a shift fork 43 and the gear 41 being held in place axially of and for rotation with respect to the driven shaft 255 by spring rings 45 and 46. Also, the driven shaft 255 carries the shiftable clutch member 52 carrying the two sets of clutch teeth 56 and 57, the latter being adapted to engage the teeth 51 formed on the hub section 50 of the gear 41. The clutch member 52 is controlled by a shift fork 59a mounted on the shift rail 111 in the manner described above.

The other gear and the compound gear unit 248 is indicated at 260 and meshes with a gear 261 mounted for rotation on a bushing 262 adjacent the forward end of the driven shaft 255. The gear 261 is provided with a hub section 263 having internal teeth 264 with which the teeth 56 on the shiftable clutch member 52 are adapted to engage when the member 52 is shifted forwardly, thereby connecting the gear 261 to the driven shaft 255.

The countershaft driving gear member 246 is substantially like the gear 6 shown in Figure 1 and includes an interior recessed portion 270 accommodating a shift ring 272 having two sets of teeth 273 and 274, the latter being in splined engagement with a set of clutch teeth 275 formed on the interior of the recessed gear member 246. A clutch collar 280 is fixed to the forward end of the driven shaft 255, in substantially the same manner that the clutch member 90 is fixed to the forward end of the driven shaft in Figure 1, and carries a set of clutch teeth 281 disposed rearwardly of the neutral position of the shiftable clutch ring 272 but adapted to be engaged with the internal clutch teeth 273 carried on the ring 272 when the latter is moved rearwardly from the position shown in Figure 3, the external teeth 274 on the shiftable ring member 272 remaining in engagement with the teeth 275 on the driving gear 246. Thus, by shifting the ring member 272 rearwardly from the position shown in Figure 3, the driving gear 246 is clutched directly to the driven shaft 255, whereby the driving and driven shafts are connected to rotate together. The gear 261 rotatably mounted on the driven shaft 255 is held against axial displacement thereon by a flange 285 on the forward end of the bushing 262 and by a spring ring 286 engaging in a groove or notches formed in the splines 256 of the driven shaft 255, and a thrust washer 287 is preferably disposed between the forward end of the fixed clutch collar 280 and the rear face of the driving gear 246. The gears 246, 247, 260 and 261 may be of any suitable type, but preferably they are of the so called silent type, such as helical gears, herring-bone gears and the like. The shiftable clutch ring 272 is controlled in substantially the same manner as the ring 93 shown in Figure 1, and hence the same reference numerals have been applied to the shift collar, shift fork and associated parts.

It is important to note that the sequence of shifting movements of the lever 121 in going from reverse through first, second, and third to fourth, or direct speed, is conventional, like the shift movements in the forms of transmissions shown in Figures 1 and 2. That is, reverse is obtained by shifting the upper end of the gear shift lever 121, in case it is the usual manually controlled lever, to the left and forwardly to engage and shift the rail 110 rearwardly. Low speed or first is obtained by bringing the upper end of the gear shift lever 121 directly rearwardly, thus shifting the gear 40 into mesh with the low speed gear 17. Returning the gear shift lever 121 to neutral and shifting the upper end to the right selects the second shift rail, and a forward movement on the upper end of the lever 121 will shift the rail 111 rearwardly, carrying the clutch member 52 into engagement with the hub 50 on the gear 41, thus connecting the latter to the driven shaft 255. The drive is then transmitted from the driving shaft 245 through the gears 246 and 247 to the countershaft and from the latter through the gears 16 and 41 to the driven shaft 255. Moving the upper end of the gear shift lever 121 rearwardly throws the rail 111 forwardly and carries the shiftable clutch member 52 into engagement with the hub 263 on the gear 261. This establishes third speed. Fourth speed is obtained by an entirely separate clutch, namely, the ring member 272, and the shift rail 112 controls the shift ring 272 through the pins 101, the grooved ring 98 and the shift fork 100, the rail 112 being selected and moved by a forward movement of the upper end of the gear shift lever 121 to the right and forwardly.

Figure 4:
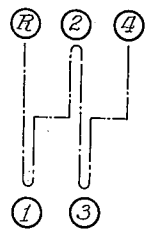
Figure 4 represents the natural sequence of shifting movements employed in the present invention.

Figure 4 illustrates the sequence of movements for the several forms of the present invention shown in Figures 1, 2 and 3, and from this figure it will be clear that in going from one ratio to the other, no unnatural or unconventional movement of the gear shift lever is necessary, as in previous constructions. The sequence of movements outlined in Figure 4 pre-supposes the employment of a conventional manually controlled gear shift lever mounted for universal movement between the upper and lower ends thereof. However, so far as the present invention is concerned, Figure 4 also represents the natural sequence of shifting movements that are desirable when the shift lever 121 is governed by any form of remote control.

While I have shown and described above the preferred constructions employing the principles of the present invention, it is to be understood that my invention is not to be limited to the specific details shown and described above, but that, in fact, widely different means may be employed in the practice of the broader aspects of my invention.

What I claim, therefore, and desire to secure by Letters Patent is:

1. In a transmission, the combination of a driving part, a driven part, an epicyclic gear unit adapted to connect said parts and including a pair of relatively rotatable members, one connected to rotate with the driving part, clutch means movable in one direction from a disengaged position to connect the other member with said driven part, and clutch mechanism separate from said clutch means and movable relative thereto in the other direction for directly connecting said parts together.

2. In a transmission, the combination of a driving shaft, a driven shaft, an epicyclic gear unit adapted to connect said shafts and including a pair of relatively rotatable members, means connecting one of said members to rotate with the driving shaft, clutch means arranged to connect the other with said driven shaft, and clutch means movable independently of said first clutch means and of said connecting means in connecting said other member with the driven shaft for directly connecting said driving and driven shafts together.

3. In a transmission having four forward speeds, the combination of a driving shaft, a driven shaft, clutch means movable in one direction for directly connecting said shafts together to establish a silent cruising speed in direct, an epicyclic gear unit adapted to connect said shafts to establish a second silent cruising speed at a different ratio and including a ring gear member and a pinion carrier member, one of said members being connected to rotate with said driving shaft, and clutch means movable separately from said first clutch means for connecting the other of said members with said driven shaft.

4. In a transmission having four forward speeds, the combination of a driving shaft, a driven shaft, clutch means movable in one direction for directly connecting said shafts together to establish a silent cruising speed in direct, an epicyclic gear unit adapted to connect said shafts to establish a second silent cruising speed at a different ratio and including a pinion carrier and a ring gear, the latter being connected to rotate with said driving shaft, and clutch means movable separately and in the opposite direction from said first clutch means for connecting said pinion carrier to said driven shaft.

5. In a transmission having four forward speeds, the combination of a driving shaft, a driven shaft, clutch means movable in one direction for directly connecting said shafts together to establish a silent cruising speed in direct, an epicyclic gear unit adapted to connect said shafts to establish a second silent cruising speed at a different ratio and including a plurality of planet gears, a stationary sun gear, a planet gear carrier connected to rotate with said driving shaft, and a ring gear, and clutch means movable separately and in the opposite direction from said first clutch means for connecting said ring gear to said driven shaft.

6. In a transmission, the combination of a driving shaft, a driven shaft, an epicyclic gear unit adapted to connect said shafts for rotation at a given ratio, said unit including a part extending rearwardly and mounted for rotation relative to said driven shaft, clutch means to connect said driving and driven shafts for rotation together, and separate clutch means movable independently of said first mentioned clutch means for connecting the rearwardly extending portion of said gear unit to said driven shaft.

7. In a transmission, the combination of a driving shaft, a driven shaft, means adapted to connect said shafts together for rotation relative to one another at a given ratio and including a part having a splined connection with said driving shaft to rotate therewith and a part mounted for rotation relative to said driven shaft and having a rearwardly directed toothed section, clutch mechanism for connecting said driving and driven shafts together for rotation at a one to one ratio, and clutch mechanism separate from said first mentioned clutch mechanism and engageable with said toothed portion and said driven shaft for driving the latter from said driving shaft at said given ratio.

8. In a transmission, the combination of a housing, driving and driven shafts journaled in coaxial relation in said housing, a gear member carried by said driving shaft and having a splined interior portion, a countershaft journaled for rotation in said housing and driven from said driving gear, gear members carried at the rear portion of said countershaft, companion gear members carried on the rear portion of said driven shaft and adapted to be driven from the gears on said countershaft, clutch mechanism for connecting said driving and driven shafts for rotation together and including a shiftable member engaging the splined interior portion of said driving gear and a companion clutch member fixed to the forward portion of said driven shaft, a gear unit for connecting said driving and driven shafts for rotation together at a given ratio and including a member having a driving connection with the splined portion of said driving gear and a second member mounted for rotation relative to said driven shaft, and clutch mechanism disposed generally rearwardly of said gear unit and movable independently of said first mentioned clutch mechanism for connecting said other part of said gear unit with said driven shaft to drive the latter at said given ratio.

9. In a transmission having four forward speeds, the combination of axially aligned driving and driven shafts, an epicyclic gear unit adapted to connect said shafts together for relative rotation at a given ratio, said epicyclic gear unit including a stationary sun gear, a plurality of planet gears meshing therewith, a planet gear carrier member supporting said planet gears in proper position, and a ring gear member mounted for rotation, said planet gear carrier including a section journaled for rotation on the driven shaft and serving as a bearing between the latter and said stationary sun gear, clutch mechanism disposed forwardly of said planet gear carrier for connecting said driving and driven shafts together, and separate clutch mechanism disposed rearwardly of said planet gear carrier member for connecting one of said members to said driven shaft.

10. In a transmission, a pair of axially aligned driving and driven shafts, a countershaft driving gear on said driving shaft and formed with a splined interior portion, a clutch collar fixed on the forward end of said driven shaft substantially in the plane of said countershaft driving gear, a shiftable clutch ring movable along the splines of said gear and adapted to connect the latter with said collar, whereby said shafts rotate together, an epicyclic gear unit also adapted to connect said shafts for relative rotation at a given ratio, said epicyclic gear unit including a pair of relatively movable members mounted for rotation relative to said driven shaft, one of said members having a splined flange connecting the member with said driving shaft to rotate therewith, the other of said members including a rearwardly directed hub section, and a shiftable clutch member cooperating with the latter and said driven shaft for connecting the other of said members with the driven shaft.

11. In a transmission, a pair of axially aligned driving and driven shafts, an epicyclic gear unit adapted to connect said shafts together for relative rotation at a given ratio, said unit including a ring gear rotatable with said driving shaft and a planet gear carrier mounted for rotation relative to said driven shaft, clutch means separate from and independent of said epicyclic gear unit for directly connecting said shafts together, and clutch mechanism separate from and independent of said first mentioned clutch means for connecting the rear end of said planet gear carrier with said driven shaft.

12. In a transmission, axially aligned driving and driven shafts, a countershaft driving gear on said driving shaft and including an interior splined portion, a clutch collar fixed to the forward end of said driven shaft, a shiftable clutch ring slidable along said splined interior portion and engageable with said clutch collar for directly connecting said driving and driven shafts, an epicyclic gear unit also adapted to connect said driving and driven shafts together and including a ring gear member having a splined flange permanently engageable with the splined interior of said countershaft driving gear, whereby said ring gear member rotates at all times with said driving shaft, a relatively stationary sun gear, a plurality of planet gears meshing with said ring gear and said sun gear, and a planet gear carrier supporting said pinions, a hub section fixed to the rear end of said planet gear carrier, and a shiftable clutch member, separate from said clutch ring, splined onto the driven shaft and engageable with said hub section to connect said planet gear carrier with said driven shaft.

13. In a transmission, a pair of axially aligned driving and driven shafts, a countershaft driving gear mounted on said driving shaft and including a splined interior portion, a clutch collar fixed to the forward end of said driven shaft, a clutch ring shiftably disposed in said interior splined portion of the countershaft driving gear and movable into a position into engagement with said clutch collar for directly connecting said driving and driven shafts, an epicyclic gear unit adapted to connect said driving and driven shafts together for relative rotation at a given ratio, said unit including a relatively stationary sun gear, a plurality of planet gears, a planet gear carrier supporting said pinions and having a splined flange engaging the splines on said interior portion of said countershaft driving gear, and a ring gear meshing with said planet pinions and having a splined hub portion, a second clutch collar fixed to said driven shaft adjacent said hub portion, and a shiftable clutch member movably mounted on said splined hub portion and shiftable into engagement with said second mentioned clutch collar for directly connecting said ring gear member to said driven shaft.

14. In a transmission, driving and driven shafts, clutch mechanism for directly connecting said shafts together for rotation at a one to one ratio, a countershaft driven from said driving shaft, gear members on said countershaft and driven shaft for driving the latter at a given ratio, an epicyclic gear unit operatively connected with said driving shaft, and a shiftable clutch member separate from said first mentioned clutch means and including a shiftable clutch part movable in one direction to connect one of said gear members to said driven shaft and shiftable in the other direction to connect said epicyclic gear unit with said driven shaft.

15. In a transmission, driving and driven shafts, an epicyclic gear unit adapted to connect said shafts and including a stationary sun gear encircling the driven shaft, a planet gear carrier including a bronze sleeve section serving as a bearing for said driven shaft in said sun gear and supporting said carrier for rotation relative to said driven shaft, and a ring gear mounted for rotation relative to said driven shaft, and means for connecting said bronze sleeve section with one of said shafts and the ring gear with the other of said shafts.

16. In a transmission having driving and driven shafts, the combination of an epicyclic gear unit including a stationary sun gear and a planet gear carrier including a bronze sleeve section mounted for rotation on said driven shaft and serving as a bearing support for said stationary sun gear on said driven shaft, and means operatively connecting said sleeve section with one of said shafts.

17. In a transmission having driving and driven shafts, the combination of an epicyclic gear unit including a stationary sun gear, a ring gear, a planet gear carrier including a bronze sleeve section journaled for rotation on the driven shaft and serving as a bearing for supporting said sun gear thereon, means at one end of said bronze sleeve section for connecting the latter with one of said shafts, and means for connecting the ring gear with the other of said shafts.

18. In a transmission, driving and driven shafts, means including an overdrive unit for transmitting the drive from said driving shaft to said driven shaft at an increased rate, said overdrive unit including a driving part fixed to rotate with said driving shaft and a driven part journaled for rotation with respect to said driven shaft, clutch mechanism movable in one direction and disposed forwardly of said driving part for operatively connecting said driving and driven shafts directly together, and separate clutch mechanism movable in the opposite direction for connecting said driven part to said driven shaft.

19. In a transmission, a pair of axially aligned driving and driven shafts, an epicyclic gear unit adapted to connect said shafts together and including a planet gear carrier and a ring gear member mounted for rotation relative to said driven shaft, said driven shaft extending through the epicyclic gear unit to a point adjacent said driving shaft, clutch mechanism for connecting said shafts directly together forwardly of the epicyclic gear unit, means connecting said planet gear carrier with said driving shaft for rotation therewith, and clutch mechanism separate from said first mentioned clutch mechanism for connecting said ring gear member with said driven shaft.

20. In a transmission, driving and driven shafts, an epicyclic gear unit adapted to connect said shafts and including a stationary sun gear encircling the driven shaft, a planet gear carrier including a sleeve section serving as a bearing for said driven shaft in said sun gear and supporting said carrier for rotation relative to said driven shaft, and a ring gear mounted for rotation relative to said driven shaft, clutch means for connecting the sleeve section with the driven shaft, and means separate from said clutch means for connecting said ring gear to the driving shaft.

21. In a transmission, driving and driven shafts, an epicyclic gear unit adapted to connect said shafts and including a stationary sun gear encircling the driven shaft, a planet gear carrier including a sleeve section serving as a bearing for said driven shaft in said sun gear and supporting said carrier for rotation relative to said driven shaft, and a ring gear mounted for rotation relative to said driven shaft, clutch means for connecting the ring gear with the driven shaft, and means separate from said clutch means for connecting said sleeve section to the driving shaft.

22. In a transmission, the combination of a driving shaft, a driven shaft, means adapted to connect said shafts together for rotation relative to one another at a given ratio and including a part connected with said driving shaft to rotate therewith and a part mounted for rotation relative to said driven shaft and having a rearwardly directed toothed section, clutch mechanism for connecting said driving and driven shafts together for rotation at a one to one ratio, and clutch mechanism separate from said first mentioned clutch mechanism and engageable with said toothed portion and said driven shaft for driving the latter from said driving shaft at said given ratio.

23. In a transmission, the combination of a housing, driving and driven shafts journaled in coaxial relation in said housing, a gear member carried by said driving shaft and having a splined interior portion, a countershaft journaled for rotation in said housing and driven from said driving gear, gear members carried at the rear portion of said countershaft, companion gear members carried on the rear portion of said driven shaft and adapted to be driven from the gears on said countershaft, clutch mechanism for connecting said driving and driven shafts for rotation together and including a shiftable member engaging the splined interior portion of said driving gear and a companion clutch member fixed to the forward portion of said driven shaft, a gear unit for connecting said driving and driven shafts for rotation together at a given ratio and including a member having a driving connection with said first mentioned gear and a second member mounted for rotation relative to said driven shaft, and clutch mechanism disposed generally rearwardly of said gear unit and movable independently of said first mentioned clutch mechanism for connecting said other part of said gear unit with said driven shaft to drive the latter at said given ratio.

24. In a transmission, the combination of a driving part, a driven part, an epicyclic gear unit adapted to connect said parts and including a pair of relatively rotatable members, one connected to rotate with the driving part, clutch means disposed at one side of said epicyclic unit and arranged to connect the other member with said driven part, and clutch mechanism separate from said clutch means and disposed at the other side of said gear unit for directly connecting said shafts together.

25. In a transmission, the combination of axially aligned driving and driven shafts, a gear unit adapted to connect said shafts and including a pair of relatively rotatable members, means at one side of said gear unit for constantly connecting one of said rotatable members with the driving shaft, clutch means at the other side of said gear unit and adapted to connect the other of said rotatable members with said driven shaft, and clutch mechanism arranged to connect said driven shaft to said driving shaft through said connecting means.

26. In a transmission, the combination of axially aligned driving and driven shafts, a gear unit adapted to connect said shafts and including a pair of relatively rotatable members, means at one side of said gear unit connecting one of said rotatable members with the driving shaft, a countershaft operatively connected forwardly of said gear unit with said means that connects said one rotatable member with the driving shaft, clutch means at the other side of the gear unit and adapted to connect the other of said rotatable members with said driven shaft, clutch mechanism separate from said clutch means disposed generally at said one side of the gear unit and adapted to connect said driven shaft to said driving shaft through said connecting means, and gear means arranged rearwardly of said gear unit for connecting the driven shaft with the countershaft.

DELMAR D. DOOLEY.